United States Patent [19]

Ushiroji et al.

[11] Patent Number: 4,912,150
[45] Date of Patent: Mar. 27, 1990

[54] GLASS FIBER REINFORCED THERMOPLASTIC RESIN COMPOSITIONS

[75] Inventors: Masashi Ushiroji, Waki; Yukio Yoshihara, Otake, both of Japan

[73] Assignee: Mitsui Petrochemical Industries, Ltd., Tokyo, Japan

[21] Appl. No.: 265,878

[22] Filed: Nov. 1, 1988

[30] Foreign Application Priority Data

Nov. 4, 1987 [JP] Japan .................. 62-278730

[51] Int. Cl.$^4$ ............... C08L 51/06; C08L 53/00; C08L 77/00; C08K 7/10
[52] U.S. Cl. ........................... 524/504; 525/66
[58] Field of Search ............ 524/504; 525/66

[56] References Cited

U.S. PATENT DOCUMENTS

| | | | |
|---|---|---|---|
| 4,404,312 | 9/1983 | Kokubu | 524/504 |
| 4,537,929 | 8/1985 | Mangrani | 524/504 |
| 4,621,115 | 11/1986 | Morita | 524/504 |

FOREIGN PATENT DOCUMENTS

| | | | |
|---|---|---|---|
| 60-53550 | 3/1985 | Japan | 524/504 |
| 60-76548 | 5/1985 | Japan | 524/504 |
| 60-212440 | 10/1985 | Japan | 524/504 |

Primary Examiner—C. Warren Ivy
Attorney, Agent, or Firm—Sherman and Shalloway

[57] ABSTRACT

A glass fiber reinforced polypropylene-polyamide resin composition which comprises:
(a) a propylene-ethylene block copolymer of an ethylene content of 5–30 mole % and of a melt flow rate of not less than 1.5 g/10 minutes in amounts of 25–65% by weight; and
(b) a polyamide in amounts of 75–35% by weight; the propylene-ethylene block copolymer and the polyamide amounting to 100% weight; and
(c) glass fibers in amounts of 10–100 parts by weight in relation to 100 parts by weight of the total of the propylene-ethylene block copolymer and the polyamide;
(d) a grafted polypropylene which has an unsaturated carboxylic acid or its derivatives grafted thereonto in amounts of 0.5–5 parts by weight in relation to 100 parts by weight of the total of the propylene-ethylene block copolymer and the polyamide; and
(e) an organic peroxide in amounts of 0.02–0.5% by weight based on the propylene-ethylene block polymer.

4 Claims, No Drawings

GLASS FIBER REINFORCED THERMOPLASTIC RESIN COMPOSITIONS

This invention relates to a glass fiber reinforced thermoplastic resin composition which contains polypropylene and polyamide resins as base resins, and has an excellent surface appearance.

A glass fiber reinforced thermoplastic resin composition which contains, as base resins, polypropylene and polyamide resins such as nylon 6 which are rendered compatible with each other with, for example, polypropylene resins grafted with unsaturated carboxylic acids such as maleic anhydride is already known. This glass fiber reinforced polypropylene-polyamide resin composition has not only a high strength, rigidity and heat resistance comparable to those of a glass fiber reinforced polyamide resin composition, but also a high melt flow, and dimension stability, strength and rigidity after absorption of water, comparable to those of a glass fiber reinforced polypropylene resin composition.

As set forth above, the glass fiber reinforced polypropylene-polyamide resin compositions have excellent properties, but on the other hand when they are injection-molded, the resultant articles have flow marks on the surface formed with high gloss portions and low gloss portions, so that the articles are markedly deteriorated in appearance. Thus, molded articles of the resin compositions can not be put to use where good appearance is needed, and the use is thus much limited.

Therefore, it is an object of the invention to obviate the problems as above described, and to provide a glass fiber reinforced polypropylene-polyamide resin composition which is excellent in surface appearance as well as in strength, rigidity, heat resistance, melt flow, and stability in dimension, strength and rigidity when the resin composition has absorbed water.

There is provided a glass fiber reinforced polypropylene-polyamide resin composition in accordance with the invention, which comprises:

(a) a propylene-ethylene block copolymer of an ethylene content of 5-30 mole % and of a melt flow rate of not less than 1.5 g/10 minutes in amounts of 25-65% by weight; and (b) a polyamide in amounts of 75-35% by weight; the propylene-ethylene block copolymer and the polyamide amounting to 100% weight; and (c) glass fibers in amounts of 10-100 parts by weight in relation to 100 parts by weight of the total of the propylene-ethylene block copolymer and the polyamide;

(d) a grafted polypropylene which has an unsaturated carboxylic acid or its derivatives grafted thereonto in amounts of 0.5-5 parts by weight in relation to 100 parts by weight of the total of the propylene-ethylene block copolymer and the polyamide; and (e) an organic peroxide in amounts of 0.02-0.5% by weight based on the propylene-ethylene block copolymer.

The propylene-ethylene block copolymer (a) used in the invention has an ethylene content of 5-30 mole %, preferably of 15-25 mole %, and a melt flow rate (as determined according to ASTM D 1238, L) of not less than 1.5 g/10 minutes, preferably of 5-60 g/10 minutes, and most preferably of 10-25 g/10 minutes. When the ethylene content in the propylene-ethylene block copolymer is smaller than 5 mole %, the resultant resin composition is inferior in impact strength, whereas when the ethylene content is larger than 30 mole %, the resultant resin composition is inferior in rigidity. On the other hand, when the melt flow rate of the propylene-ethylene block copolymer is smaller than 1.5 g/10 minutes, the resultant resin composition is inferior in melt flow so that the resin composition is inferior in moldability, whereas when the melt flow rate is larger than 60 g/10 minutes, the resultant resin composition is inferior in mechanical strength.

It is preferred that the propylene-ethylene block copolymer (a) used in the invention be composed of a polypropylene (i) having an isotactic index of not less than 90, preferably of not less than 95, in amounts of 60-94%, preferably of 70-87% by weight; a propylene-ethylene block copolymer (ii) having an ethylene content of 20-80 mole %, preferably of 40-80 mole %, in amounts of 1-15%, preferably of 5-12% by weight; and either a polyethylene (iiia) or a propylene-ethylene block copolymer (iiib) having a propylene content of not more than 10 mole %, each having an intrinsic viscosity [$\eta$] of not less than 2.0 dl/g, in amounts of 5-25%, preferably of 8-18% by weight. It is most preferred that the propylene-ethylene block copolymer (ii) be displaced by a propylene-ethylene block copolymer (iv) having an isotacticity of not less than 0.8 in the above preparation of the propylene-ethylene block copolymer (a), since the copolymer (iv) has a small tackiness.

When the propylene-ethylene block copolymer (ii) is contained in the propylene-ethylene block copolymer (a) in amounts of smaller than 1% by weight, the resultant resin composition tends to have an insufficient impact strength, whereas when in amounts of larger than 15% by weight, the resultant resin composition tends to have an insufficient rigidity.

On the other hand, when the polyethylene (iiia) or the propylene-ethylene block copolymer (iiib) is contained in the propylene-ethylene block copolymer (a) in amounts of smaller than 5% by weight, the resultant resin composition tends to have an insufficient impact strength, whereas when in amounts of larger than 25% by weight, the resultant resin composition tends to have an insufficient rigidity. The use of either the polyethylene (iiia) or the propylene-ethylene block copolymer (iiib) each having an intrinsic viscosity [$\eta$] of not less than 2.0 dl/g improves mechanical strength of the resultant resin composition.

Herein the specification, the ethylene content in the propylene-ethylene block copolymers is determined by $^{13}$C-NMR spectrometry; the isotactic index is designated by amounts (% by weight) of insolubles in boiling n-heptane; and the intrinsic viscosity [$\eta$] is determined at 135° C. in decalin.

The propylene-ethylene block copolymer (a) used in the invention is not a polymer blend copolymer, but is a block copolymer which is produced by (co)polymerizing olefins in the presence of a stereospecific polymerization catalyst, which is preferably composed of a transition metal catalyst supported on a carrier material and an organoaluminum compound, in a single reactor. Such a polymerization is already known, as is described in Japanese Patent Laid-Open No. 52-98045 and Japanese Patent Publication No. 57-26613.

However, the propylene-ethylene block copolymer (a) may be a mixture of two or more of propylene-ethylene block copolymers which have been separately prepared. When such a mixture is used, however, it is needed that the mixture has the ethylene content and melt flow rate as specified hereinbefore.

The propylene-ethylene block copolymer (a) used in the invention has an intrinsic viscosity [$\eta$] in the range of 1.4–2.8 dl/g, preferably of 1.6–1.9 as determined at 135° C. in decalin.

The polyamide used in the invention is already known, and includes polyamides which are produced by, for example, polycondensation of aliphatic, alicyclic or aromatic diamines such as hexamethylenediamine, decamethylenediamine, dodecamethylenediamine, 2,2,4- or 2,4,4-trimethylhexamethylenediamine, 1,3- or 1,4-bis(aminomethyl)cyclohexane, bis(p-aminocyclohexylmethane), or m- or p-xylylenediamine, with aliphatic, alicyclic or aromatic dicarboxylic acids such as adipic acid, suberic acid, sebacic acid, cyclohexanedicarboxylic acid, terephthalic acid or isophthalic acid. Further, the polyamide used in the invention includes, for example, those which are prepared by condensation of aminocarboxylic acids such as $\epsilon$-aminocaproic acid or 11-aminoundecanoic acid, as well as those which are produced using lactams such as $\epsilon$-caprolactam or $\omega$-laurolactam, or copolyamides thereof. Mixtures of these polyamides are also usable in the invention.

Preferred examples of the polyamide used in the invention may be exemplified by nylon 6, 66, 610, 9, 11, 12, 6/66, 66/610 or 6/11, with nylon 6 or 66 most preferred since these nylons are exellent in rigidity and heat resistance.

The polyamide used in the invention is not specifically limited in molecular weight, but it is preferred that the polyamide has a relative viscosity $\eta_r$ of not less than 1.0 as determined in 98% sulfuric acid according to JIS K 6810, and the use of a polyamide having a relative viscosity $\eta_r$ of not less than 2.0 is most preferred since it has a high mechanical strength.

The propylene-ethylene block copolymer (a) and the polyamide (b) are contained in the glass fiber reinforced polypropylene-polyamide resin composition of the invention in such proprtions that the former (a) amounts to 25–65% by weight, preferably 30–60% by weight, and the latter (b) amounts to 75–35% by weight, preferably 70–40% by weight, the total of the propylene-ethylene block copolymer (a) and the polyamide (b) being 100% by weight. The propylene-ethylene block copolymer (a) and the polyamide (b) will be hereinafter referred to as the base resins.

When the amount of the propylene-ethylene block copolymer (a) in the base resins is smaller than 25% by weight, or when the amount of the polyamide (b) in the base resins is larger than 75% by weight, the resultant resin composition has an insufficient melt flow and moldability, and is reduced in strength and dimensional stability when the composition has absorbed water. Meanwhile, when the amount of the propylene-ethylene block copolymer (a) in the base resins is larger than 65% by weight, or when the amount of the polyamide (b) in the base resins is smaller than 35% by weight, the resultant resin composition is small in mechanical strength.

The glass fibers used in the invention may be any one used in the production of conventional glass fiber reinforced plastics, and includes, for example, glass loving, glass chopped strand, glass milled fibers, glass powder, glass staple and glass cloth. The glass fibers are contained in the resin composition in amounts of 10–100 parts by weight in relation to 100 parts by weight of the total of the propylene-ethylene block copolymer and the polyamide. When the glass fiber content is smaller than 10 parts by weight in relation to 100 parts by weight of the base resins, the resultant resin composition is of an insufficient mechanical strength, in particular of an insufficient strength at high temperatures, whereas when the glass fiber content is larger than 100 parts by weight, the resultant resin composition gives injection-molded articles inferior in appearance as well as insufficient in melt flow.

The grafted polypropylene used in the invention is a polypropylene having an unsaturated carboxylic acid or its derivatives graft-polymerized thereonto. The graft to a polypropylene is preferably in the range of 0.01–10% by weight based on the grafted polypropylene. When the graft is smaller than 0.01% by weight, no compatibility between the propylene-ethylene block copolymer (a) and the polyamide (b) is attained, but also no resin composition which is of high heat resistance and mechanical strength is obtained. However, when the graft is larger than 10% by weight, the resultant resin composition is undesirably of an insufficient water resistance.

In the graft modification of polypropylenes, there may be used as graft monomers, for example, acrylic acid, maleic acid, fumaric acid, tetrahydrophthalic acid, itaconic acid, citraconic acid, crotonic acid, isocrotonic acid or endo-cis-bicyclo[2.2.1]hepto-5-ene-2,3-dicarboxylic acid, and as these derivatives, for example, acid halides such as acid chlorides, acid imides, acid anhydrides or acid esters. More specifically, there may be mentioned as derivatives of unsaturated carboxylic acids, for example, maleoyl dichloride, maleinamide, maleic anhydride, citraconic anhydride, maleic acid monomethylester, dimethyl maleate or glycidyl maleate. Among the above, unsaturated dicarboxylic acids or their anhydrides are most preferred as graft monomers, in particular, such as maleic acid, endo-cis-bicyclo[2.2.1]hepto-5-ene-2,3-dicarboxylic acid or their anhydrides.

For the production of the grafted polypropylene, any known method may be adopted. For instance, the graft polymerization is carried out by adding a graft monomer to a melted polypropylene or a solution of polypropylene. The graft polymerization is carried out preferably using a radical initiator so that the graft monomer grafts to polypropylene in a high grafting efficiency at temperatures usually of about 60°–350° C. The amount of the radical initiator used is usually in the range of 0.01–1 part by weight in relation to 100 parts by weight of the polypropylene used.

A variety of radical initiators may be used, such as organic peroxides, organic peresters or azo compounds. More specifically, diarylperoxides or dialkylperoxides are preferred, such as dicumylperoxide, di-t-butylperoxide, 2,5-dimethyl-2,5-di(t-butylperoxy)hexyne-3,2,5-dimethyl-2,5-di(t-butylperoxy)hexane or 1,3-bis(t-butylperoxyisopropyl)benzene.

The grafted polypropylene is contained in the resin composition of the invention in amounts of 0.5–5 parts by weight in relation to 100 parts by weight of the base resins. When the amount of the grafted polypropylene in the resin composition is smaller than 0.5 parts by weight in relation to 100 parts by weight of the base resins, no compatibility is obtained between the propylene-ethylene block copolymer (a) and the polyamide (b), and thus the composition is of insufficient mechanical strength, whereas when the amount of the grafted polypropylene in the resin composition is larger than 5 parts by weight, the resin composition has a low molecular weight in average, and accordingly the resin composition has a small mechanical strength.

The resin composition of the invention further contains an organic peroxide. The organic peroxide usable is exemplified by benzoylperoxide, lauroylperoxide, dicumylperoxide or 1,3-bis(t-butylperoxyisopropyl)-benzene. The organic peroxide is contained in the resin composition in amounts of 0.02–0.5 % by weight based on the propylene-ethylene block copolymer (a). When the amount of the organic peroxide in the resin composition is smaller than 0.02% by weight based on the propylene-ethylene block copolymer (a) used, the resin composition provides injection-molded articles deteriorated in surface appearance, whereas when the amount of the organic peroxide in the resin composition is larger than 0.5% by weight based on the propylene-ethylene block copolymer (a) used, the resin composition has a low molecular weight in average, and accordingly the resin composition has a small mechanical strength.

The resin composition of the invention may be produced by admixing the components of (a) to (e) as hereinbefore described with, for example, Henschel mixers, V-blenders, ribbon blenders or tumble mixers, and then melting and kneading them together with, for example, single-screw extruders, multi-screw extruders, kneaders or Banbury mixers. The use of a high performance machine such as multi-screw extruders, kneaders or Banbury mixers is recommended since a high quality granulated resin composition is obtained in which the components are uniformly dispersed therein.

The resin composition of the invention may be molded in a conventional molding method, such as injection molding or rotational molding, into various articles excellent in surface appearance, for example, with single-screw extruders, vent-type extruders, two-channel screw extruders, two-channel conical screw extruders, cokneaders, plasticators, mixtruders, two conical screw extruders, planetary screw extruders, gear extruders or screwless extruders.

Since the resin composition of the invention contains an organic peroxide as described before, injection-molded articles thereof in particular have no flow mark on the surface, and therefore have an excellent surface appearance, in addition to excellent properties which the glass fiber reinforced polypropylene-polyamide resin originally have, such as a high strength, rigidity, heat resistance and melt flow, and a high stability in dimension, strength and rigidity after the resin compoition has absorbed water. Therefore, injection-molded articles made of the resin composition of the invention can be put to use where good appearance is needed.

The invention will now be more fully described with reference to examples, however the examples are illustrative only and the invention is not limited thereto.

EXAMPLE 1

In amounts as shown in Table 1, respectively, (a) a propylene-ethylene block copolymer having an ethylene content of 25 mole % and a melt flow rate of 14 g/10 minutes;

(b) a polyamide (nylon 6) having a relative viscosity of 2.6;

(c) glass fibers of 3 mm in length and 13 μm in diameter;

(d) a polypropylene grafted with maleic acid anhydride having a graft of 3.0% by weight; and (e) 0.05% by weight of 1,3-bis(t-butylperoxyisopropyl)benzene based on the propylene-ethylene block copolymer (a), were mixed together with a tumble blender, and then granulated to pellets with a two-screw extruder.

TABLE 1

| | Components | Examples 1 | 2 | 3 |
|---|---|---|---|---|
| (a) | (% by weight) | 43 | 30 | 57 |
| (b) | (% by weight) | 57 | 70 | 43 |
| (c) | (parts by weight)[1] | 43 | 43 | 43 |
| (d) | (parts by weight)[1] | 1.4 | 1.4 | 1.4 |
| (e) | (% by weight)[2] | 0.05 | 0.05 | 0.05 |

Notes:
[1] In relation to 100 parts by weight of the total of (a) and (b).
[2] Based on the weight of (a).

The pellets were injection-molded into specimens. The surfaces of the specimens were examined with the eyes, and were found even and high in gloss.

Mechanical properties were determined as follows. tensile strength: ASTM D 638; flexural strength: ASTM D 790; flexural modulus: ASTM D 790; Izod impact strength: ASTM D 256; and heat deflection temperature: ASTM D 648.

Gloss was determined as follows in accordance with ASTM D 523. Since the gloss unevenness on molded articles is clearly seen with colored articles, a colored resin composition was prepared, and using the same, colored plates of 2 mm thick, 120 mm wide and 130 mm long were molded. One hundrded points were determined at the central area of the plate as intersections of longitudinal ten lines and lateral ten lines each extending at a distance of 9 mm therebetween and intersecting at right angles, and at each point the gloss was determined.

With regard to low gloss articles such as of glass fiber reinforced resin, usually the gloss is determined at an incident angle of 60° or more, however, herein the specification the gloss is determined at an incident angle of 20° since the measurement is in a good coincidence with the observation with the eyes.

The results are shown in Table 2, in which the gloss is the average of the glosses at the 100 points and the gloss unevenness is designated by variances.

REFERENCE EXAMPLE 1

A homopolypropylene having a melt flow rate of 11 g/10 minutes was used in place of the propylene-ethylene block copolymer and without incorporating an organic peroxide, a glass fiber reinforced resin composition was prepared otherwise in the same manner as in Examples.

Specimens were injection-molded and the properties thereof were determined in the same manner as in Examples. The results are shown in Table 2.

TABLE 2

|  | Examples | | | Reference Examples | | |
| --- | --- | --- | --- | --- | --- | --- |
|  | 1 | 2 | 3 | 1 | 2 | 3 |
| Tensile strength (kgf/cm$^2$) | 1,100 | 1,200 | 1,000 | 1,300 | 1,000 | 1,300 |
| Flexural strength (kgf/cm$^2$) | 1,500 | 1,600 | 1,400 | 1,900 | 1,600 | 1,800 |
| Flexural modulus (kgf/cm$^2$) | 60,000 | 62,000 | 58,000 | 75,000 | 63,000 | 70,000 |
| Izod impact strength (kgf.cm/cm) | 12 | 11 | 14 | 10 | 14 | 8 |
| Heat deflection temperature (°C.) | 187 | 201 | 171 | 190 | 186 | 190 |
| Gloss |  |  |  |  |  |  |
| Average | 23.6 | 21.2 | 24.0 | 26.0 | 14.3 | 25.5 |
| Variance | 4.26 | 4.18 | 4.48 | 8.28 | 6.01* | 9.08 |
| F-value* | 1.94 | 1.98 | 1.85 | 1 | 1.38 | 1.10 |

Note:
*F-value in relation to Reference Example 1. For example, 1% in F-distribution with degree of freedom of 100, $F_{100}^{100}(0.01)$, is 1.59.

Also the surface thereof of the articles were examined with the eyes. The surfaces were found to have flow marks thereon involving highly glossy portions and low glossy portions, and as results the articles were much inferior in appearance.

REFERENCE EXAMPLE 2

Without the use of an organic peroxide, a glass fiber reinforced resin composition was prepared otherwise in the same manner as in Examples.

Specimens were injection-molded and the properties thereof were determined in the same manner as in Examples. The results are shown in Table 2.

Also the surfaces thereof of the articles were examined with the eyes. There was found no gloss unevenness on the surfaces, however, the gloss was found low on the whole.

REFERENCE EXAMPLE 3

A homopolypropylene having a melt flow rate of 11 g/10 minutes was used in place of the propylene-ethylene block copolymer, and otherwise in the same manner as in Examples, a glass fiber reinforced resin composition was prepared.

Specimens were injection-molded and the properties thereof were determined in the same manner as in Examples. The results are shown in Table 2.

The surfaces of injection-molded articles were found to have flow marks thereon involving highly glossy portions and low glossy portions, and as results the articles were much inferior in appearance.

As will be clearly seen, the resin composition of the invention has tensile strength, flexural strength, flexural modulus and heat deflection temperature comparable to those of the resin composition prepared using a homopolypropylene but no organic peroxide in Reference Example 1, and of the resin composition prepared using a homopolypropylene and an organic peroxide in Reference Example 3. The resin composition of the invention has a larger Izod impact strength than the compositions of Reference Examples 1 and 3.

Further, the resin composition of the invention has substantially the same properties as those of the composition in Reference Example 2 which contains no organic peroxide, but otherwise the same as the composition of the invention. The resin composition of the invention provides molded articles which have a higher and evener gloss than the articles of the composition of Reference Example 1.

The improvement in surface appearance of the articles of the resin composition of the invention is also known quanitatively in Table 2. Namely, the variances in gloss of Examples 1–3 are smaller than those of Reference Examples, and the average glosses of Examples 1–3 are almost the same as those of Reference Examples 1 and 3. Moreover, F-test also illustrates the improvement in gloss of the articles made of the composition of the invention, since the F-values of Examples 1–3 are larger than $F_{100}^{100}(0.01)$.

What is claimed is:

1. A glass fiber reinforced polypropylene-polyamide resin composition which comprises:
   (a) a propylene-ethylene block copolymer of an ethylene content of 5–30 mole % and of a melt flow rate of not less than 1.5 g/10 minutes in amounts of 25–65% by weight; and
   (b) a polyamide in amounts of 75–35% by weight; the propylene-ethylene block copolymer and the polyamide amounting to 100% weight; and
   (c) glass fibers in amounts of 10–100 parts by weight in relation to 100 parts by weight of the total of the propylene-ethylene block copolymer and the polyamide;
   (d) a grafted polypropylene which has an unsaturated carboxylic acid or its derivatives grafted thereonto in amounts of 0.5–5 parts by weight in relation to 100 parts by weight of the total of the propylene-ethylene block copolymer and the polyamide; and
   (e) an organic peroxide in amounts of 0.02–0.5% by weight based on the propylene-ethylene block copolymer.

2. The resin composition as claimed in claim 1 wherein the grafted polypropylene is a polypropylene grafted with maleic anhydride.

3. The resin composition as claimed in claim 1 wherein the polyamide has a relative viscosity of not less than 1.0 as determined in 98% sulfuric acid.

4. The resin composition as claimed in claim 1 which contains the propylene-ethylene block copolymer in amounts of 30–60% by weight, and the polyamide in amounts of 70–40% by weight based on the total thereof.

* * * * *